Dec. 20, 1960 J. EISENBERG 2,965,040

GEAR PUMPS

Filed July 21, 1958

INVENTOR
James Eisenberg
BY G. Ralph Burch
ATTORNEY

United States Patent Office 2,965,040
Patented Dec. 20, 1960

2,965,040

GEAR PUMPS

James Eisenberg, Newark N.J., assignor to Eco Engineering Company, a division of Economy Faucet Company, Newark, N.J., a corporation of New Jersey Filed July 21, 1958, Ser. No. 749,698

2 Claims. (Cl. 103—126)

This invention relates to gear pumps and more particularly to a gear pump especially designed for pumping nonlubricating and corrosive fluids.

It is an object of the invention to construct the pump to eliminate the need of lubrication and effect a tight seal of the operating parts to prevent leakage and contamination of the fluids being pumped.

A further object of the invention resides in constructing the spur gears of the pump of Teflon which reduces slip and provides constant flow delivery against varying discharge pressures.

A still further object resides in effecting a tight seal between the housing and end plates by means of a Teflon O-ring seated in a groove formed in the ends of the housing.

A still further object resides in a gear pump having bearings for the shafts of the gears provided with grooves in the outer and inner peripheries of the bearings to allow the fluid being pumped to circulat throughout the length of the bearing to lubricate the shafts of the gears.

Another object of the invention resides in providing a gear pump which is simple and durable in construction, reliable and efficient in operation and inexpensive to manufacture.

Other objects and advantages of the invention will be apparent during the course of the following description.

In the accompanying drawing, forming a part of this specification, and in which like numerals are employed to designate like parts throughout the same:

Figure 1:
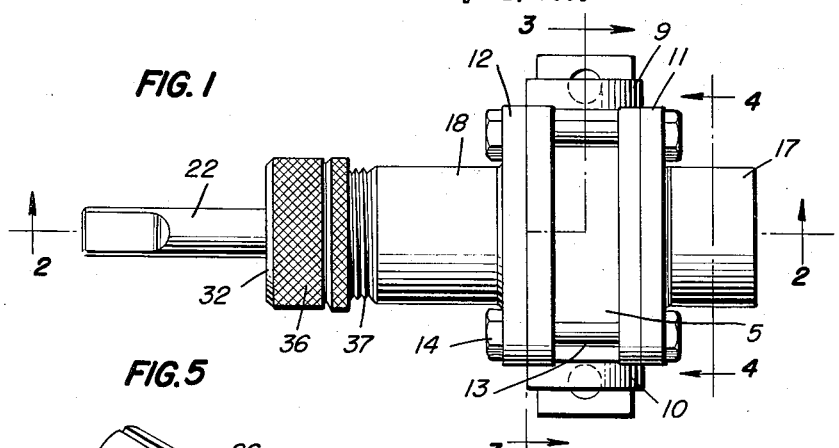
Fig. 1 is a side elevational view of the pump.
Figure 5:
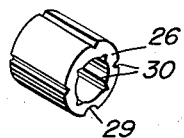
Fig. 5 is a perspective view of one of the bearings.
Figure 2:
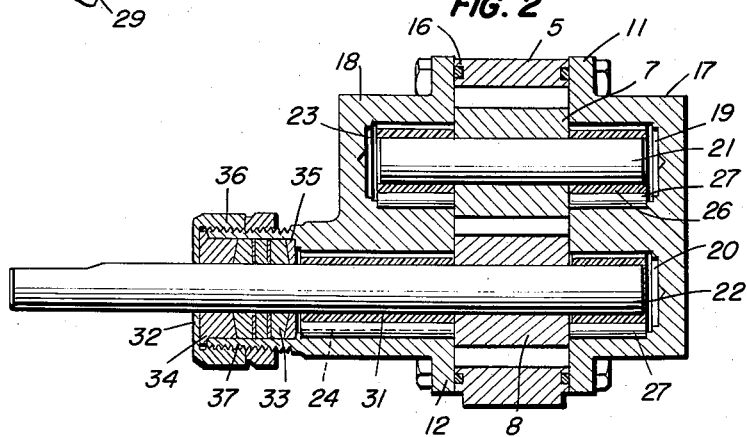
Fig. 2 is a longitudinal sectional view taken on line 2—2 of Fig. 1.
Figure 3:
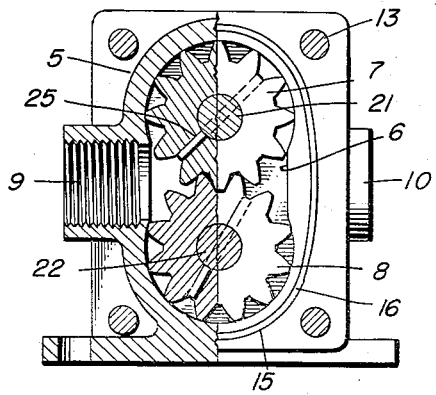
Fig. 3 is a cross sectional view taken on line 3—3 of Fig. 1.
Figure 4:
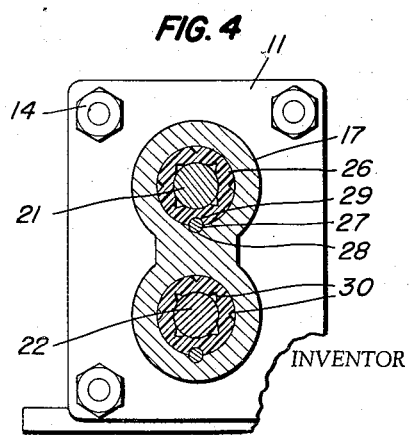
Fig. 4 is a cross sectional view taken on line 4—4 of Fig. 1.

In the drawing, a pump housing 5 of rectangular shape is provided with an elongated chamber 6 rounded at its ends to receive intermeshing spur or other type gears 7 and 8 which are preferably constructed of Teflon. The opposite sides of the housing are provided with interiorly threaded ports 9 and 10 communicating with the chamber for connecting the pipe lines leading to and from the housing. The ends of the housing are closed by end walls 11 and 12 secured to the housing by studs 13 passing through the housing and walls having nuts 14 on their ends for securely clamping the end walls in tight engagement with the housing. A groove 15 is formed in each end of the housing, surrounding the chamber 6, adapted to receive a Teflon O-ring 16 to effect a tight leak-proof seal between the end walls and housing.

The end walls 11 and 12 have exterior bosses 17 and 18, the boss 17 having a pair of spaced interior recesses 19 and 20 to receive on end of the spur gear shafts 21 and 22, and the boss 18 having an interior recess 23 to receive the opposite end of shaft 21 and an extended passage 24 through which the opposite end of shaft 22 extends for connection with a motor or other prime mover. The spur gears 7 and 8 are fixed on shafts 21 and 22 by a lock pin 25 so that the shafts turn with the gears. Each of the recesses 19, 20 and 23 are fitted with a Teflon sleeve bearing 26 in which the ends of the shafts are journaled. The bearings are secured in the recesses against rotation by a lock pin 27 seated in grooves 28 and 29 formed in the wall of the recess and outer periphery of the bearing respectively. The bearings are of such length as to terminate short of the inner end of the recesses and are provided with a series of shallow grooves 30 in their outer and inner peripheries extending lengthwise of the bearings which allows the fluid being pumped to flow from the chamber along the grooves in the outer periphery of the bearings and then reverse its course to flow along the grooves in the inner periphery of the bearings thus lubricating the shafts as they rotate in the bearings. A sleeve bearing 31 of the same construction as the bearings 26, but of greater length, is mounted in the passage 24 to receive the extended end of shaft 22. A packing gland 32 is mountd on the extended end of shaft 22 to seal the passage 24 consisting of a series of packing rings 33 disposed between front and rear glands 34 and 35 held in place by packing nut 36 threaded on the extension 37 of passage 24.

In use, a fluid pipe line is connected to the ports 9 and 10 of the pump housing and upon rotation of shaft 22, spur gears 7 and 8 are rotated to force the fluid through the pipe line under pressure. It is important that the fluid being pumped is not contaminated by contact with other fluids and the present pump is designed so that the fluid being pumped serves to lubricate the bearings in which the shafts of the gears are journaled, thus obviating the necessity of using other lubricants. The bearing sleeves supporting the shafts being provided with external and internal grooves allow the fluid being pumped to pass from the chamber along the bearing sleeves and then back into the chamber. It is also important to seal the housing against leakage and this is accomplished by the O-ring seated in a groove in the end of the housing surrounding the gear chamber which is compressed when the end walls are secured to the housing thus establishing a tight leak-proof seal between the housing and end walls.

It is to be understood the form of invention herein shown and described is a preferred example of the same and changes in the shape, size and arrangement of the parts may be made without departing from the spirit of the invention.

Having thus described my invention, I claim:

1. A gear pump for corrosive fluids comprising a housing having a rectangular body portion provided with a transverse passage therethrough of substantially oval shape forming a chamber, O-rings mounted in grooves formed in the ends of said body portion in surrounding relation to said chamber, end walls covering the ends of said body portion, fasteners extending through said body portion and end walls for compressing said end walls into sealing engagement with said O-rings, intermeshing gears mounted in the chamber of said body portion with the faces of said gears in contact with the end walls, rotary shafts supporting said gears having their ends projecting into bearing recesses formed in said end walls, said shafts terminating short of the closed ends of said recesses, bearing sleeves fixedly mounted in said recesses rotatably supporting the ends of said shafts and terminating short of the closed ends of said recesses, the outer and inner peripheries of said bearing sleeves having a series of longitudinal grooves extending the full length of said sleeves establishing a two-way passage between the said chamber and the closed ends of said bearing recesses to provide a continuous flow of fluid from said chamber into and from said bearing recesses upon rotation of said gears.

2. A gear pump for corrosive fluids as described in claim 1 including lock pins mounted in mating grooves formed in the wall of said bearing recesses and the other periphery of said bearing sleeves.

References Cited in the file of this patent

UNITED STATES PATENTS

| | | |
|---|---|---|
| 1,271,970 | Wood | July 9, 1918 |
| 1,379,587 | Fisher | May 24, 1921 |
| 1,673,261 | Meston et al. | June 12, 1928 |
| 2,549,659 | Brendel | Apr. 17, 1951 |
| 2,663,599 | MacKay | Dec. 22, 1953 |
| 2,714,857 | Albright et al. | Aug. 9, 1955 |
| 2,775,209 | Albright | Dec. 25, 1956 |
| 2,809,592 | Miller et al. | Oct. 15, 1957 |
| 2,825,286 | White | Mar. 4, 1958 |

FOREIGN PATENTS

| | | |
|---|---|---|
| 750,060 | Great Britain | June 6, 1956 |